Dec. 9, 1958    H. M. FREDERICK    2,863,655
CENTRIFUGALLY RESPONSIVE ACTUATOR
Filed May 17, 1956

INVENTOR.
HAROLD M. FREDERICK
BY
AGENT

United States Patent Office 2,863,655
Patented Dec. 9, 1958

2,863,655

CENTRIFUGALLY RESPONSIVE ACTUATOR

Harold M. Frederick, Berwyn, Pa., assignor to Burroughs Corporation, Detroit, Mich., a corporation of Michigan Application May 17, 1956, Serial No. 585,567

1 Claim. (Cl. 264—17)

The present invention relates to mechanical actuating devices and more particularly to devices of the type activated in response to centrifugal force.

While the device is of broader applicability it is particularly useful as a switch actuator for disconnecting automatically a driven unit from its source of power in response to certain operating conditions. For example, it may be used as a centrifugally responsive circuit breaker to cut off power to a motor in case of overspeeding of the latter due to loss of load such as follows a broken drive belt, loss of field current, or other cause.

Heretofore available switch actuating devices operating in response to centrifugal force have been proposed for similar applications, but all have disadvantages limiting the desired commercial range of use. Generally, such devices are rigidly mounted remote from the motor and are connected to the motor shaft by coupling elements. Furthermore, these prior devices are incapable of operation at speeds met in present day equipment, primarily because of unsolved problems of size, inertia and dimensions, all of which are important factors.

The present invention has for its primary object to provide a novel centrifugally responsive actuator mechanism of the above identified type wherein the foregoing disadvantages have been overcome.

Another object of the invention is to provide a centrifugally actuated circuit breaker.

A further object is to provide a mechanical actuator mechanism automatically operative in response to a preselected rotative speed.

Still another object of the invention is to provide an overspeed trip device of such small size as to enable it to be mounted directly to a rotating shaft.

A more specific object of the invention is to provide such a device characterized by its low inertia factor, its good mechanical balance, its simplicity of operation, and its inexpensive construction.

In accordance with the above objects and first briefly described in connection with an exemplary embodiment thereof, the apparatus includes a movable element normally biased to an inoperative retracted position by resilient means but movable to an extended operable position by centrifugally responsive means when rotated at a preselected speed.

The invention may be clearly understood from the following detailed description with reference to the accompanying drawings wherein.

While in its broader aspects, as mentioned above, the invention is applicable to other appropriate devices, the following description is in connection with its use as an operating agency for circuit switches.

Figures 1, 2:
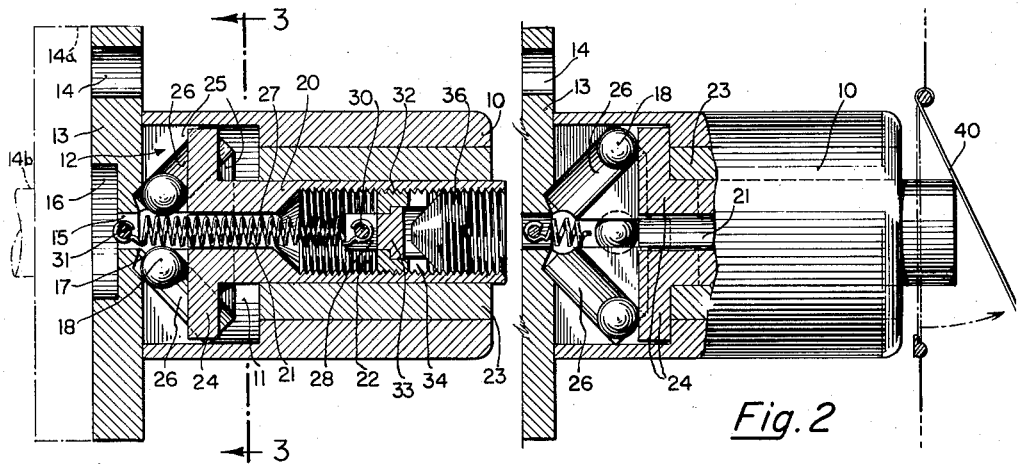
Fig. 1 is a sectional view taken along the line 1—1 of Fig. 3 showing a preferred form of the invention, the movable parts being shown in retracted inoperative position.
Fig. 2 is a side elevational view with parts broken away to show the movable parts in extended operative position.

Now referring to the drawings illustrating a preferred embodiment of the invention and particularly to Fig. 1, it is seen that the numeral 10 designates a cylindrical housing having a counter-bore 11 at one end, the left as shown here. The housing is secured to a cylindrical base 12, having a flange 13 provided with apertures 14 for attaching the device to a coupling flange 14a upon a motor shaft 14b for rotation therewith, the latter two elements being shown in broken lines. Base 12 is provided with a through bore 15 opening at its outer end into a counter-bore 16, the latter being for assembly purposes as will later appear. As more clearly seen in Fig. 4 depressed seats 17 are provided around the inner end of bore 15 for accommodating a plurality of balls 18 (Fig. 1) which provide the centrifugally responsive means for actuating the device, as more fully described hereinafter.

Seated on the balls is a tubular plunger 20 having an axial bore 21 aligned with base bore 15 and opening at its outer end into an internally threaded bore 22 of larger diameter. Plunger 20 is arranged for axial sliding movement relative to the housing, being guided by an encircling bushing 23 fixed within housing 10. Bushing 23 may be of any desired type but preferably is of the type manufactured by "Thomson Industries Incorporated" of Manhasset, New York, and known as a "Ball Bushing." This type of bushing is desirable because it reduces friction to a minimum.

Figure 3:
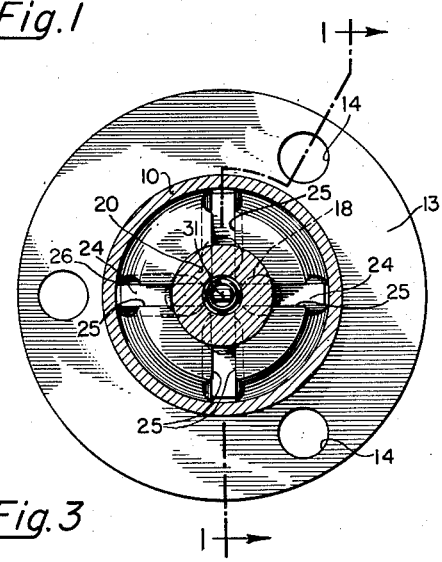
Fig. 3 is a sectional view taken on the line 3—3 of Fig. 1.
Figure 4:
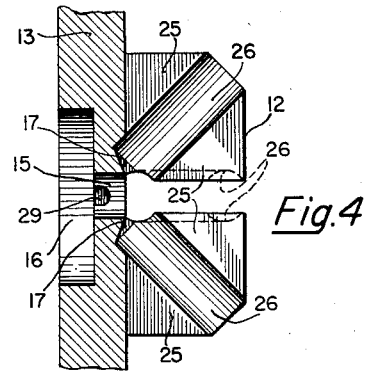
Fig. 4 is a fragmentary sectional view of an element of the apparatus.
Figure 5:
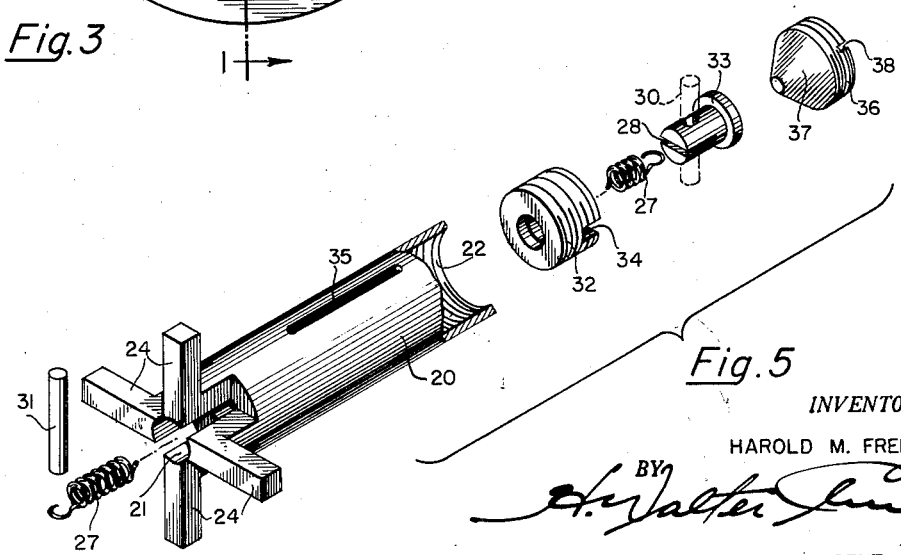
Fig. 5 is an exploded view of the actuator elements of the apparatus.

With reference to Fig. 5 it is seen that the inner end of plunger 20 is formed with four radially extending projections 24 which are confined in counter-bore 11 (Fig. 1) of housing 10 and seated against balls 18. For operative association with projections 24, base 12 is formed with four slots 25 (Fig. 3) extending radially outwardly from bore 15 preferably 90° apart and dimensioned to form guides for projections 24. As seen in Fig. 4, the opposite side faces of each slot 25 are formed with grooves 26, each disposed at an angle, preferably of 45°, from the axis of base 12. Each pair of grooves 26 form a race for one of the balls 18 permitting the balls to move radially outwardly at an angle relative to the axis and against a respective projection 24 to shift plunger 20 outwardly to the right, as illustrated in Fig. 2.

A tension spring 27 is positioned in bore 21 with one end attached to a retainer element 28 by pin 30, and its opposite end attached within bore 15 by a pin 31 the ends of which seat in a transverse groove 29, Fig. 4. Counter bore 16 makes it possible to insert pin 31 through the spring terminal convolution and to seat the pin in groove 29 transversely of the bore 15, thus to hold the spring under tension. The spring provides means to oppose the force exerted by balls 18 in response to centrifugal action and so makes it possible to delay movement of plunger 20 until a predetermined shaft speed is reached.

The retainer element 28 passes axially through a stepped hole in an externally threaded annulus 32 and has a circumferential shoulder 33 seated on the annulus 32. Preferably the outer face of the annulus 32 has two diametrically disposed slots 34 for engagement by a spanner wrench or screw driver which can be inserted through the open end of the plunger to screw the annulus inwardly or outwardly relative to bore 22 thus to adjust the tension of spring 27. As the annulus 32 moves axially to make such an adjustment, twisting of spring 27 is prevented by providing oppositely disposed slots 35 in plunger 20, only one of which is shown, see Fig. 5, and into which the ends of attaching pin 30 extend. Slots 35 run lengthwise and parallel to the axis of the plunger so that pin 30 is free to ride along the slots but is held against turning movement which would adversely twist the spring.

In order to lock annulus 32 in its selected tensioning position an externally threaded lock member or nut 36 is screwed into the open end of plunger 20. The inner end 37 of member 36 is in the shape of a truncated cone which permits it to enter the annulus and lock the same against movement. The opposite end of member 36 is provided with a slot 38 for engagement by a screwdriver or other adjusting element.

In the operation of the device it should first be understood that the function of the presently illustrated embodiment is to open a switch in an electric circuit such as shown at 40 in Fig. 2, when the speed of shaft 14b to which the unit is attached, exceeds a selected speed. For example, the unit can be set for plunger action at a speed of 7,000 R. P. M. by proper tensioning of spring 27. In this connection it should be understood that the spring constant is such that when the centrifugal force is sufficient to start the balls 18 moving outwardly in the ball races, the force of balls 18 against plunger 20 as they move outwardly will increase at a rate greater than the rate at which the spring force will increase by stretching. Therefore, as soon as the initial movement of the plunger takes place, balls 18 will immediately fly out to their extreme outward position and thereby result in quick ejection of the plunger to trip switch 40. While 7,000 R. P. M. has been selected as an example, the device can have a relatively wide range of adjustment by variation of the spring tension or a change in the spring characteristics.

It will now be apparent that the invention provides a novel unit for association with a rotating shaft to function in response to a selected shaft speed to move an actuating member. Further the unit includes means to vary its speed response and thus make possible settings over a range of shaft speeds for actuation of the plunger element.

What is claimed is:

A centrifugally responsive actuator comprising: an annular base, said base having means for attachment thereof to a rotating element, an axial bore, a plurality of slots radiating from said bore, and grooves in the walls defining said slots, said grooves forming ball races extending angularly outward from said bore; a ball mounted in each of said ball races; a tubular housing telescopically and snugly fitted over said base; a plunger axially mounted in said housing for slidable movement between a normal retracted position substantially within said housing, and an extended position in which a portion projects from the outer end of said housing, said plunger having a stepped axial bore therethrough, the walls forming the enlarged portion at the outer end thereof being threaded; radially disposed projections on said plunger and positioned in said slots against said balls; a coil spring extending through the smaller portion of the bore of said plunger, and having one end fixed to said base and the other end secured to said plunger for urging said plunger to its retracted position against said balls; and means for adjusting the tension of said spring whereby, in response to the centrifugal action of said balls at a preselected speed of rotation of the rotating element, said plunger may be projected axially from its retracted to its extended position, said adjusting means comprising a screw threadedly received within the threaded portion of the bore of said plunger and having a stepped axial bore therethrough, a flanged plug element extending through the bore of said screw, the flange of said plug seating on said step preventing it from passing completely through said screw, said plug element having a slotted projection extending towards said base, and a pin by which the end of said spring is secured to said plunger within said slot, said pin extending transversely through said projection and into longitudinal slots provided in the walls of said plunger, whereby said plug element is prevented from rotating during turning of said screw for presetting the tension of said spring thereby to adjust the speed at which said plunger will respond to the centrifugal force of said balls, and a lock screw threadedly received within the threaded portion of the bore of said plunger from the outer end thereof and having a conical portion engaging the rim of the axial bore in said adjusting screw in a manner to hold said adjusting screw against rotation during operation of the actuator.

References Cited in the file of this patent

UNITED STATES PATENTS

| | | |
|---|---|---|
| 993,982 | Halliwell | May 30, 1911 |
| 1,953,664 | Walker | Apr. 3, 1934 |
| 2,068,484 | Coffey | Jan. 19, 1937 |
| 2,402,972 | Mitchell | July 2, 1946 |
| 2,570,287 | Taylor | Oct. 9, 1951 |

FOREIGN PATENTS

| | | |
|---|---|---|
| 384,795 | Great Britain | Dec. 15, 1932 |
| 385,696 | Germany | Dec. 6, 1923 |

UNITED STATES PATENT OFFICE
CERTIFICATE OF CORRECTION

Patent No. 2,863,655                                               December 9, 1958

Harold M. Frederick

It is hereby certified that error appears in the printed specification of the above numbered patent requiring correction and that the said Letters Patent should read as corrected below.

Column 3, line 13, for "element" read -- implement --.

Signed and sealed this 26th day of May 1959.

(SEAL)
Attest:

KARL H. AXLINE                                               ROBERT C. WATSON

Attesting Officer                                           Commissioner of Patents